United States Patent

D'Amore

[15] 3,683,356
[45] Aug. 8, 1972

[54] FISH CALLER
[72] Inventor: Michael J. D'Amore, Milwaukee, Wis.
[73] Assignee: D'Amore Industries, Inc., Milwaukee, Wis.
[22] Filed: Dec. 4, 1969
[21] Appl. No.: 882,163

[52] U.S. Cl. ...................340/279, 43/17, 43/17.1, 340/394
[51] Int. Cl. .............................A01k 93/00
[58] Field of Search .........340/279, 394; 43/17.1, 17, 43/17.5, 17.6

[56] References Cited

UNITED STATES PATENTS 2,784,399  3/1957  Smith ......................340/394
3,105,233  9/1963  D'Amore et al. ...........340/394
2,577,229  12/1951 Carnes......................340/394
2,920,318  1/1960  Balcken et al.............340/394
3,310,902  3/1967  Godby ......................43/17 X
3,416,254  12/1968 Bornzin ....................43/17.1
2,517,479  8/1950  Grimm et al..................43/17
2,528,083  10/1950 Ruff...........................43/17.6

Primary Examiner—John W. Caldwell
Assistant Examiner—Scott F. Partridge
Attorney—Fred Wiviott

[57] ABSTRACT

A fish caller adapted to be disposed in water and including a source of electric energy, an illuminator, a buzzer and a mercury switch for intermittently placing the buzzer and illuminator in circuit with the energy source.

4 Claims, 9 Drawing Figures

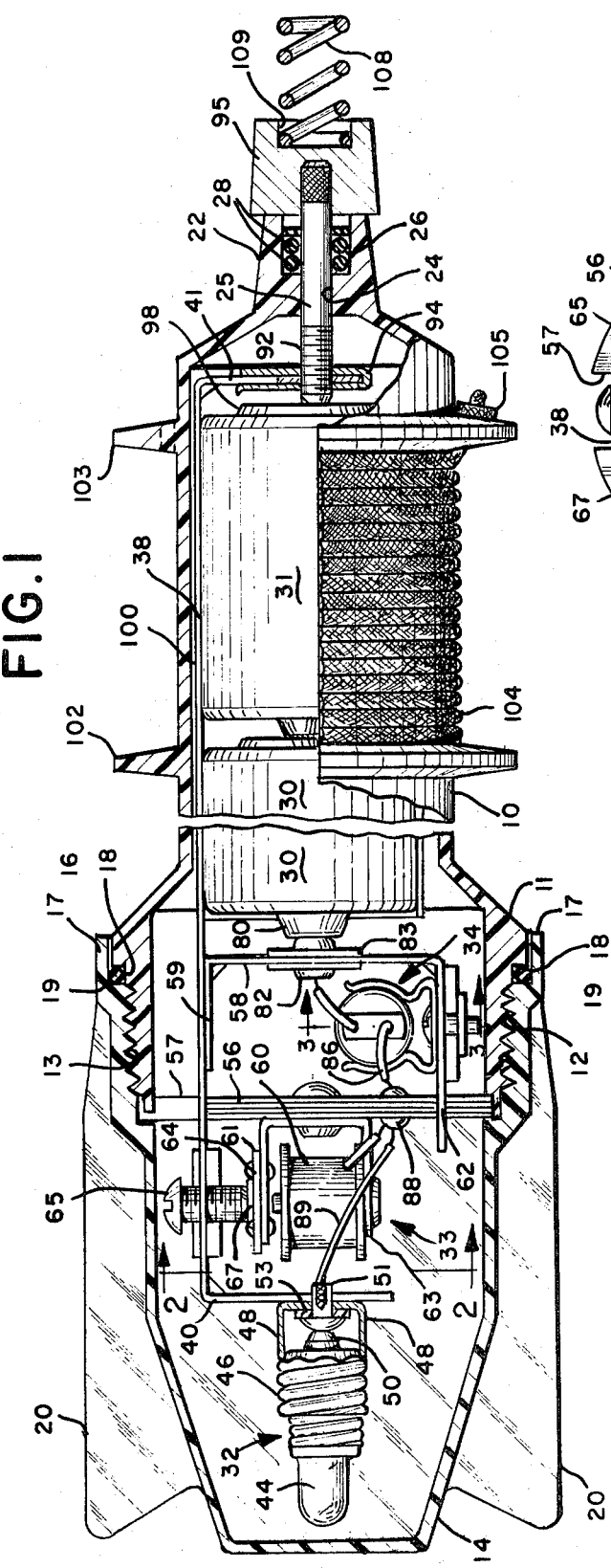

PATENTED AUG 8 1972 3,683,356

INVENTOR,
MICHAEL J. D'AMORE

By Fred Wiriott
Attorney

FISH CALLER

BACKGROUND OF THE INVENTION

This invention relates to fish callers and more particularly to an underwater fish calling device which selectively provides a continuous or intermittent buzzing and illumination for attracting fish.

Fish callers which employ illumination and a buzzing sound are well known in the art as disclosed in U.S. Letters Pat. No. 3,105,233. Such devices are adapted to be suspended below water level and include a lamp and buzzer which are in circuit with a suitable energy source such as a battery. The glow produced by the lamp along with the buzzing sound are calculated to attract fish to the vicinity of the caller where they may be caught by conventional means. Such prior art fish callers were not wholly satisfactory because the continuous glow and steady buzzing sound did not always attract fish to the desired degree. In addition, such prior art devices produced a constant battery drain so that frequent battery replacement was required.

It is an object of the invention to provide a new and improved fish calling device.

Another object of the invention is to provide a fish calling device which selectively provides lamp glow and sound continuously or intermittently as desired.

Yet another object of the invention is to provide a fish calling device in which increased battery life is provided.

These and other objects and advantages of the instant invention will become more apparent from the detailed description thereof taken with the accompanying drawings.

BRIEF DESCRIPTION OF THE DRAWINGS

FIG. 1 is a side elevational view partly in section of the preferred embodiment of the fish caller according to the instant invention;

FIG. 2 is a view taken along lines 2—2 of FIG. 1;

FIG. 3 is a view taken along lines 3—3 of FIG. 1;

SUMMARY OF THE INVENTION

Figure 4:
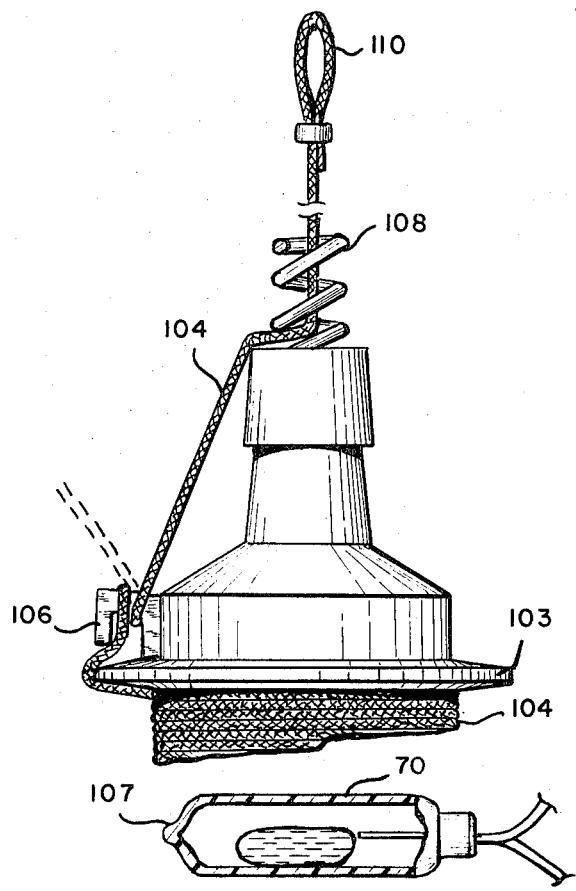
FIG. 4 is a fragmentary view of the fish caller shown in FIG. 1.

A fish caller including a source of electrical energy, electro-responsive fish attracting means, attitute responsive circuit making and breaking means for completing and energizing circuit to the fish attracting means when in one attitude and for open circuiting the same when in another attitude.

DESCRIPTION OF THE PREFERRED EMBODIMENTS

FIG. 1 shows the fish caller 9 according to the instant invention to include an outer, generally cylindrical, shell 10 of any suitable material such as plastic. One end of the shell 10 is open and has a section of increased diameter 11 which is provided with external threads 12 formed around its circumference for receiving the mating internal threads 14 of a transparent cap member 15, formed of any suitable material such as plastic. The open end of the shell 10 is sealed when the cap 14 is in its position shown in FIG. 1, by means of an O-ring gasket 16 which surrounds the section 11 adjacent the inner end of the threads 12 and which in turn is surrounded by an axially extending skirt 17 formed on the end of the cap 14. The gasket 16 is also disposed between a first axially extending surface 18 formed on the shell section 11 and a parallel surface 19 formed on the cap 14 so that when the cap is tightened the gasket 16 will be compressed between these surfaces to thereby seal the shell 10.

The cap 14 may also be provided with suitable, integrally formed, fins 20 to increase the movement of the caller 9 in response to the motion of the water in which it may be disposed.

A reduced diameter neck section 22 is provided at the other end of the shell 10 and has an axial bore 24 formed therein for receiving a contacting shaft 25 whose purpose will be discussed in greater detail hereinbelow. The neck 22 has a recess 26 formed at the outer end of the bore 24 for receiving a pair of gaskets 28 which surround the shaft 25 and seal the end of the casing 10.

The shell 10 encloses the operative components of the fish caller which are shown in FIG. 1 to include a suitable source of electrical energy, such as a pair of flashlight batteries 30 and 31, a lamp assembly 32, a buzzer assembly 33 and attitude responsive circuit making and breaking device, such as a mercury switch 34.

An elongate, metallic, electrically conductive bracket member 38 extends axially from the cap 14 to the neck portion 22 along one side of the shell 10 and is bent at right angles at each of its opposite ends to form leg portions 40 and 41.

The lamp assembly 32 includes a lamp 44 having a threaded base 45 for being received in a threaded socket 46 which is secured to and connected in electrical circuitry with the conductive bracket member 38 by means of metallic support members 48. The central contact 50 of the lamp 44 engages a contact member 52 mounted on leg 40 but electrically isolated therefrom by an insulating washer 53.

The buzzer assembly 33 is shown in FIGS. 1 and 2 to be supported on the generally circular insulating plate member 56 which is substantially co-extensive with the shell section 11 and which is held in abutment with the end thereof by the cap 14. The bracket member 38 extends through a slot 57 formed in one edge of the plate 56 and a generally U-shaped support member 58 has one leg 59 secured to bracket 38 and its other leg 60 extending through a suitable opening 62 formed in plate 56 and adjacent its other side. The buzzer assembly 33 includes an electro-magnetic coil 60 and a magnetic spring armature member 61 each of which are affixed to a conductive bracket member 63 secured to the plate 56. The armature 61 is generally elongate and has one end affixed by rivets 64 to bracket 63 and the other end extends over the coil 60 as shown in FIG. 2. A conductive screw 65 extends through and is threadably received in a suitably formed aperture in bracket 38 and engages a contact 67 carried by the armature member 61.

The attitude responsive circuit making and breaking assembly 34 may comprise, for example, a mercury switch 70 which includes an insulating glass shell 71, a pair of contacts 72 and 73 extending through shell 71 and a quantity of mercury 74 disposed therein. Those skilled in the art will appreciate that when the shell 71 has an attitude wherein the mercury 74 bridges the contacts 72 and 73, the switch 70 will be in a closed or conductive state and when the shell 71 is in an attitude wherein the mercury 74 is out of bridging relation to the contacts 72 and 73 the switch will be in an open or nonconductive condition. The mercury switch 70 may be supported by a clip 76 which is mounted on the arm 60 of bracket 57 by a bolt 78 and a thumb screw 79 which permit attitude adjustments of switch 70.

The batteries 30 and 31 are connected in series with the positive terminal 80 of battery 30 electrically engaging a contact member 82 mounted on, but electrically insulated from the bracket 57 by an insulating support 83. Conductors 85 and 86 respectively connect contacts 72 and 73 of switch 70 to terminal 82 and a second terminal 88 affixed to the insulating plate 56. A second pair of conductors 89 and 90 respectively connect terminal 88 to the lamp terminal 51 and coil 60.

The threaded end 92 of shaft 25 at the opposite end of the device may be threadably received in a conductive bracket member 94 which is clipped to the leg 41 of the elongate bracket 38. The opposite end of the shaft 25 is keyed to a knob 95 whereby rotation of the knob 95 in opposite directions will move the end of shaft 25 into and out of engagement with the negative terminal 98 of battery 31. When the shaft 25 is in its engaged position shown in FIG. 1, the return path for the lamp 44 is provided through socket 46, bracket 48, conductive bracket 38, member 94 and shaft 92 to the negative terminal 98 of battery 31. Similarly the return path for buzzer 93 will be completed through conductive bracket 63, armature 61 contact 67, screw 65, brackets 38, and 94 and shaft 92.

When the shaft 25 is rotated out of its engaged position relative to the negative battery terminal 98, the lamp 44 and coil 60 will remain de-energized regardless of the position of mercury switch 74. On the other hand, when the shaft 25 is in its engaged position and the mercury switch 74 bridges the contacts 72 and 73, the lamp 44 will be illuminated. In addition, the coil 60 of buzzer 33 will initially be energized to attract armature 61. Movement of armature 61 away from screw 65 opens the circuit between contact 67 and screw 65 to de-energize the coil 60. This in turn will cause the armature 61 to be released whereby it resiliently returns to its initial position so that contact 67 is moved into engagement with the screw 65 to re-establish the circuit through coil 60. The making and breaking of the circuit to coil 60 in this matter and the resultant attraction and release of armature 61 will cause the latter to emit a buzzing sound. The pitch of this buzz may be increased or decreased by turning the screw 65 to increase or decrease the distance between the armature 61 and the coil 60.

A sleave member 100 of any suitable insulating material such as plastic may be disposed around the batteries 30 and 31 and the bracket member 38 to secure the operating components just described in a unitary assembly.

The casing 10 may be provided with a pair of radially extending spaced apart flanges 102 and 103 which are disposed adjacent the neck portion 22 for retaining a length of suitable cord 104 which is wrapped around the casing 10 when the device is not in use. One end of the cord may pass through a suitable opening in flange 103 to be secured by a stop member 105. In addition, as seen in FIG. 4, a hook 106 may be integrally formed on the casing 10 between the flange 103 and the neck portion 22 and disposed on the side thereof opposite the end 107 of the mercury switch 70. Also, a coil spring 108 may be secured in and extend axially from a recess 109 formed in the knob 95.

Figure 5A:
FIGS. 5 and 5a illustrate the fish caller of FIG. 1 in one of its operative positions.
Figure 5:
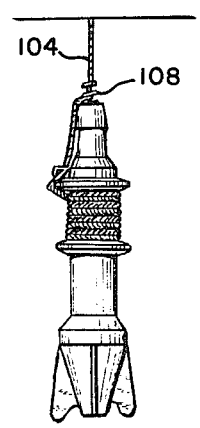

When it is desired to suspend the fish caller from a boat, for example, the operator first determines whether intermittent or continuous operation is desired. To obtain intermittent operation the cord 104 is looped around the hook 106 and the free end 110 is passed through the convolutions of spring 108 so that the caller 9 will hang substantially vertically as shown in FIG. 5. This will bring the mercury 74 into close proximity with the contacts 72 and 73 which are disposed in generally horizontal space relation as shown in FIG. 5a. The wave action of the water will rock the device causing the mercury 74 to move into and out of engagement with the contacts 72 and 73 and thereby, to cause intermitten energization of the lamp 44 and the buzzer assembly 33. This action is enhanced by the fins 20.

The mercury switch 70 may be angularly adjusted to water conditions by loosening the thumb screw 79 and tilting the end 107 downwardly in the case of rough water and upwardly in the case of calm water. This insures that relatively rough water does not cause substantially continuous operation or that the device does not remain de-energized in calm water.

Figure 6A:
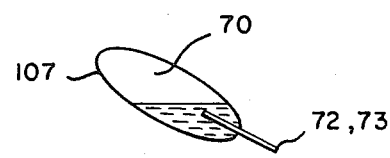
FIG. 6 and 6a illustrate the fish caller according to the invention in another one of its operative positions.
Figure 6:
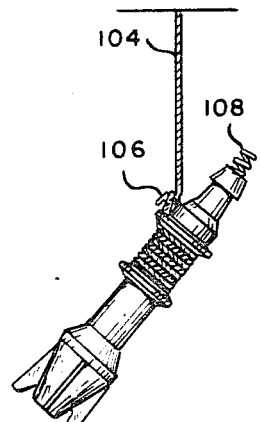

If the operator desires continuous operation, the cord 104 will be removed from the spring 108 as shown by phantom lines in FIG. 4 and in FIG. 6. This will cause the assembly 9 to hang at an inclined angle to tilt the switch 70 so that the mercury will be in engagement with the contacts 72 and 73, as seen in FIG. 6a, so that continuous operation of the lamp 44 and the buzzer 33 will be achieved.

Figure 7:
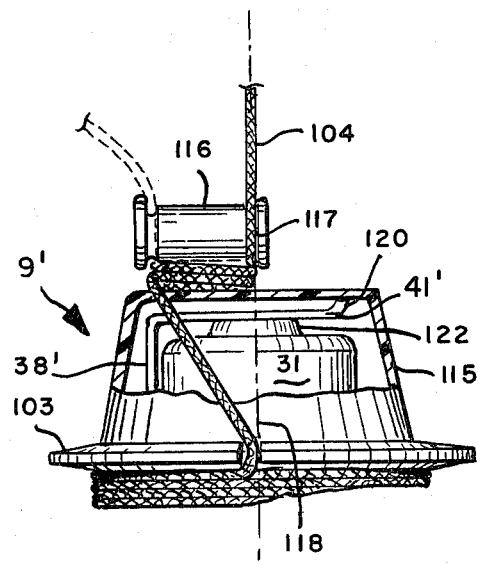
FIG. 7 is a fragmentary view partly in section showing an alternate embodiment of the invention.

FIG. 7 shows an alternate embodiment of the fish caller 9' according to the invention to include a generally cup shaped end 115 integral with the shell (not shown). A support member 116 is attached to or integrally formed with the end 115 and has a generally cruciform configuration with one arm 117 lying along the center line 118 of the fish caller 9' and the arm 119 disposed radially therefrom. When it is desired to suspend the fish caller 9' in a vertical position as shown in FIG. 7, the cord 104 is wound around the arm 117. In order to support the caller 9' in its tilted or continuously on position, the cord is removed from the arm 117 and wound around the arm 119 as shown by phantom lines.

Also illustrated in FIG. 7 is an alternate means for completing the circuit between the battery 31 and the conductive bracket 38'. Here the leg portion 41' is resilient and has an end 120 bent outwardly into engagement with the internal surface of the shell end 115. An electrical connection between the arm 41' and the positive terminal 122 is completed when the end cap 14 is tightened down fully to resiliently force terminal 122 and arm 41' together. When the cap 14 is rotated a few turns outwardly, this resilient engagement is released and the circuit between terminal 122 and arm 41' open circuited.

It will be appreciated from the foregoing that the fish caller 9 according to the invention, will provide either intermittent or continuous operation as desired. The normal, non-continuous operation will enhance fish attraction and increase battery life.

While only a few embodiments of the invention have been shown and described, it is not intended to be limited thereby, but only by the scope of the appended claims.

I claim:

1. A fish caller adapted to be disposed in water, comprising electro-responsive means for providing fish attracting emissions when energized, a source of electrical energy, and circuit making and breaking means connected between said electro-responsive means and said energy source for effecting intermittent energization of said electro-responsive means, said circuit making and breaking means comprising an attitude responsive switch means constructed and arranged to energize and deenergize said electro-responsive means in response to changes in attitude, casing means constituting a water tight enclosure for the aforementioned elements, a suspension cord means fastened to said casing for suspending the casing in water from a point above the casing, said cord being fastened at a place on said casing which allows the cord to extend along at least part of the length of the casing toward the point of suspension, first selective suspension means on said casing for suspending said casing in a first attitude whereupon said attitude responsive switch means energizes said electro-responsive means intermittently and second selective suspension means for suspending said casing in a second attitude whereupon said attitude responsive switch means energizes said electro-responsive means continuously, said first suspension means being disposed substantially on the longitudinal axis of said casing means and being adapted to engage with said cord between the place of attachment and the point of casing suspension to suspend said casing in said first attitude, said second suspension means being associated with said casing and displaced radially from said longitudinal axis and being adapted to engage with said cord between said place of attachment and the point of casing suspension to suspend said casing in said second attitude wherein said longitudinal axis is substantially more inclined than in said first attitude.

2. The fish caller set forth in claim 1 wherein said attitude responsive switch means is a mercury switch means and is disposed at a critical attitude when said fish caller is in a first position wherein the mercury in the switch is positionally unstable and slight changes in attitude will cause said mercury to move back and forth for interruption and completion of the energizing circuit to said electro-responsive means.

3. The fish caller set forth in claim 2 and including means for adjusting the attitude of said switch means relative to said casing.

4. The fish caller set forth in claim 1 including:
   a. flange means spaced apart on said casing and extending generally radially therefrom to define a suspension cord spool means on the outside surface of said casing.

* * * * *